Jan. 11, 1927.
J. P. HAINZIGIANIS
TOOTHBRUSH HOLDER
Filed March 9, 1925
1,613,655
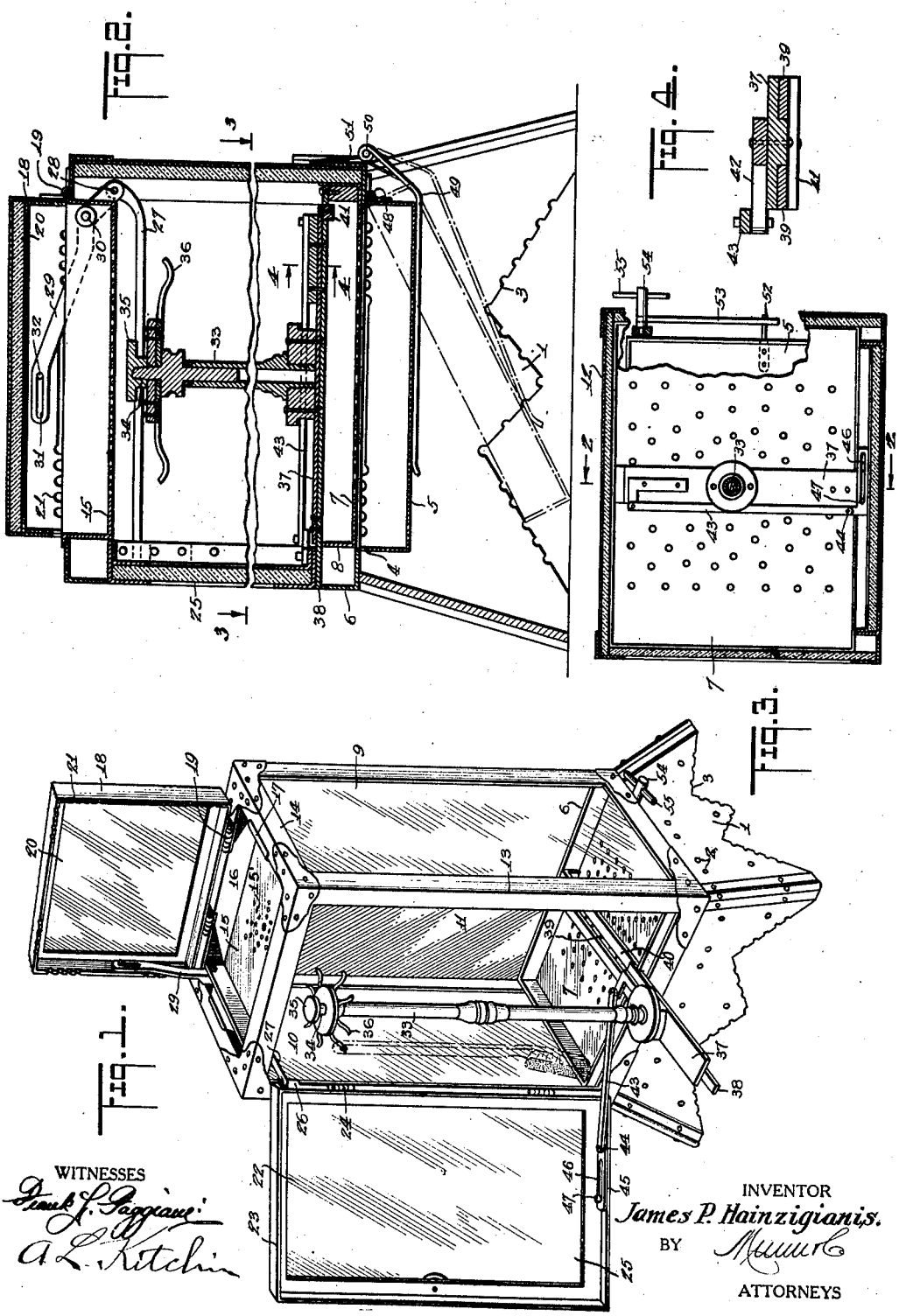
WITNESSES
INVENTOR
James P. Hainzigianis.
BY
ATTORNEYS Patented Jan. 11, 1927.

1,613,655

UNITED STATES PATENT OFFICE.

JAMES P. HAINZIGIANIS, OF NEW YORK, N. Y.

TOOTHBRUSH HOLDER.

Application filed March 9, 1925. Serial No. 14,293.

This invention relates to tooth brush holders and has for an object to provide an improved construction wherein the brushes normally are maintained in a comparatively tight enclosure but are automatically moved therefrom when the closure is opened.

Another object of the invention is to provide a tooth brush holder which will present a compartment for a number of tooth brushes and a second compartment for tooth paste and the like, the structure being so formed that both the compartments will open simultaneously.

A still further object of the invention is to provide a tooth brush holder wherein there is provided an enclosing casing together with a supporting structure for tooth brushes so formed that when the door of the casing is opened, the supporting structure for the tooth brushes will move automatically out of the container and when the door is again closed, the tooth brushes and their support will automatically move into the casing.

In the accompanying drawing—

Figure 1 is a perspective view of a tooth brush holder disclosing an embodiment of the invention, the same being shown open and ready for use.

Figure 2 is a vertical sectional view through the structure shown in Figure 1, the central part being removed in order that the upper and lower parts may be shown on an enlarged scale.

Figure 3 is a sectional view through Figure 2, approximately on line 3—3.

Figure 4 is a detail fragmentary sectional view through Figure 2, approximately on line 4—4.

Referring to the accompanying drawing by numerals, 1 indicates a base which is preferably formed of metal and provided with a number of apertures 2 as well as notches 3 whereby air may freely pass therebeneath and from thence through the notches 4 in the drip pan 5 arranged within the base. Mounted on the base 1 is a frame 6 formed preferably of angle iron and which supports a perforated bottom 7. The bottom 7 is provided with an upturned flange 8 at its edges whereby a pan effect is produced and in addition, the flanges on three sides act to help retain in place the glass walls 9, 10 and 11, the glass member 11 being preferably formed as a mirror and covered at the back with a sheet of metal 12. Four posts 13 are connected to the frame 6 and extend upwardly a desired distance. The upper ends of the various posts 13 are riveted or otherwise secured to a frame 14 preferably formed from angle bars. A pan 15 is mounted within frame 14 and supported thereby through the action of the various side flanges having their upper ends turned over for forming supporting hooks 17 which overlap part of the frame as indicated particularly in Figure 1. Preferably, the pan 15 is also formed with a number of perforations 18 whereby any liquid may freely drain from the pan. This pan is adapted to receive tubes containing tooth paste and other desirable articles. A cover or lid 18 is connected to the frame 14 by suitable hinges 19, said lid being adapted to be moved down so as to engage the inner edge of the frame 14 when closed and to be moved upwardly to expose the pan 15 when open. Preferably, a mirror 20 is provided on the inner surface of the cover 18. Also, preferably a number of notches 21 are provided in the lower edge of the cover 18 whereby there may be a free circulation of air.

Particularly from Figure 1, it will be noted that the device is provided with a front door 22 which is perferably formed with a frame 23 connected to one of the posts 13 by suitable hinges 24. A glass pane 25 is arranged in frame 23. In order that the cover 18 shall be opened simultaneously with the opening of the door 22, a bracket 26 is connected with the door 22 and a link 27 is pivotally connected to this bracket. The opposite end of link 27 is pivotally connected to the short end 28 of the lever 29, which lever is pivotally mounted at 30 on the frame 14. The outer end of arm 29 is provided with a slot 31 through which the pin 32 extends, said pin being rigidly secured to the cover 18. By reason of the construction just described, whenever the door 22 is opened fully, cover 18 will be opened fully. As the bracket 26 is near the line of the hinges 24, door 22 will open partially before the cover 18 begins to open while the cover 18 will close before the door 22 will close.

In order to properly support and have at a convenient place a number of brushes, a standard 33 is provided which is supplied with a rotatable fitting 34 near the upper end; which fitting has a thumb knob 35 whereby the fitting may be freely rotated manually to bring any of the supporting hooks 36 to any desired position whereby tooth brushes mounted thereon may be secured. The standard 33 is rigidly secured to a plate 37 at the lower end, said plate being provided with a web or thickened portion 38 adapted to slidingly fit into the slot or opening 39 in the guiding member 40, which guiding member is riveted or otherwise rigidly secured to the bottom 7. A retaining cleat 41 is connected by rivets or otherwise to the flange or bead 38 so as to prevent accidental disengagement of the parts. A bracket 42 is riveted or otherwise rigidly secured to the plate 37 and has pivotally connected therewith a link 43 which in turn is pivotally connected at 44 to a sliding bar 45, which bar is provided with a slot 46 accommodating the pin 47, which pin is rigidly secured to the frame 23 of door 22. By this construction and arrangement, whenever door 22 is opened as shown in Figure 1, link 43 will be pulled and plate 37, with the standard 33, will be moved outwardly until all of the brushes are exposed and in position to be readily grasped. When it is again desired to place the brushes back into the container, all that is necessary to do is to hang the brushes on the various hooks 36 and close the door 22, said action causing the standard 33 to automatically move back into the casing until it assumes the position shown in Figure 3. In case any moisture should drip from pan 5 or from the brushes, the same will pass through the bottom 7 and will be caught by the drip pan 5 which is hinged to the frame 6 by suitable hinges 48 and is normally held in operative position by an arm 49 pivotally mounted on the frame 6 at 50 and held continually in operative position by a suitable spring 51. The pan 5 is also provided with a pin or extension 52 adapted to be engaged by the arm 53, which arm is rigidly secured to a pivotally mounted rotatable stub shaft 54 carrying finger holds 55. When the shaft 54 is rotated in one direction, arm 53 will press against pin 52 and cause the pan 5 to swing down to the position shown in dotted lines in Figure 2 whereby the same may be readily emptied. As soon as the shaft 54 is released, spring 51 will cause the parts to again assume their operative position with the upper edge of the pan 5 substantially in a horizontal position.

What I claim is:—

1. A tooth brush holder, comprising a casing having a hinged lid and a hinged door, means forming a receptacle in the casing immediately below the top acting to support articles, a tooth brush supporting standard normally arranged in the casing, a sliding member secured to said standard and acting to support the same, a guide secured to the casing and acting to slidingly support said sliding member, the connection between the guide and the sliding member being such that the sliding member may be moved so as to position said standard interiorly and exteriorly of the casing at will, and means co-acting with said lid and with said door for causing the door when opening to raise said lid and move the standard to a position exteriorly of the casing and when the door is being closed to cause the lid to be closed and the standard to be simultaneously moved into the casing.

2. A tooth brush holder, comprising a casing having a hinged door and a hinged top, a plurality of connecting means for connecting the top with the door so that the top and door will open and close together, a tooth brush supporting standard, and means co-acting with the standard and the door for causing the door to move the standard into the casing when the door is closed and to a point exteriorly of the casing when the door is opened.

3. A tooth brush holder, comprising a casing, a standard, a rotatable member having a plurality of hooks for receiving and supporting a plurality of tooth brushes on the standard, a sliding member supporting said standard, a guide secured to said casing acting to slidingly support said sliding member, said sliding member being capable of movement into and out of said casing while carried by said guide, said casing being provided with a hinged door, a sliding plate mounted on said door, and a link pivotally connected to one end of said sliding plate and to the sliding member which supports the standard whereby when the door is open the standard will be moved to a position exteriorly of the casing and when the door is closed the standard will be moved to a position interiorly of the casing.

4. A tooth brush holder, comprising a casing, a standard for supporting a plurality of tooth brushes in the casing, said casing having a hinged door for permitting access into the casing, a hinged cover for the top of the casing, a pivotally mounted arm carried by the casing near the top, said arm having a slot at one end, a pin extending through said slot and part of said top whereby when said arm is moved said top will be opened or closed, a bracket carried by said door, and a link pivotally connected with said bracket and with said arm in such a manner that when the door is open the arm will be moved for opening the top and when the door is closed the arm will be moved for causing the top to be closed.

JAMES P. HAINZIGIANIS.